Aug. 4, 1959 R. P. DELLNER 2,897,919
AIRLINE OILER
Filed March 21, 1957
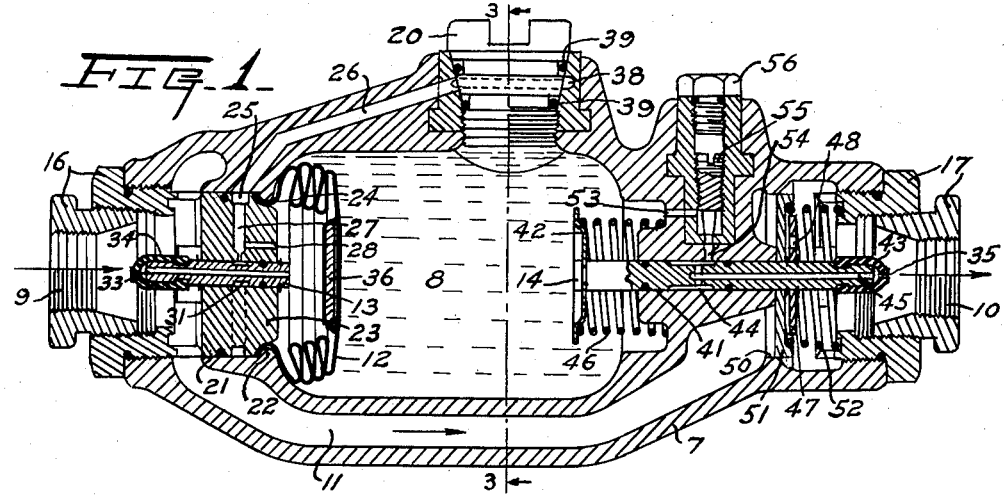
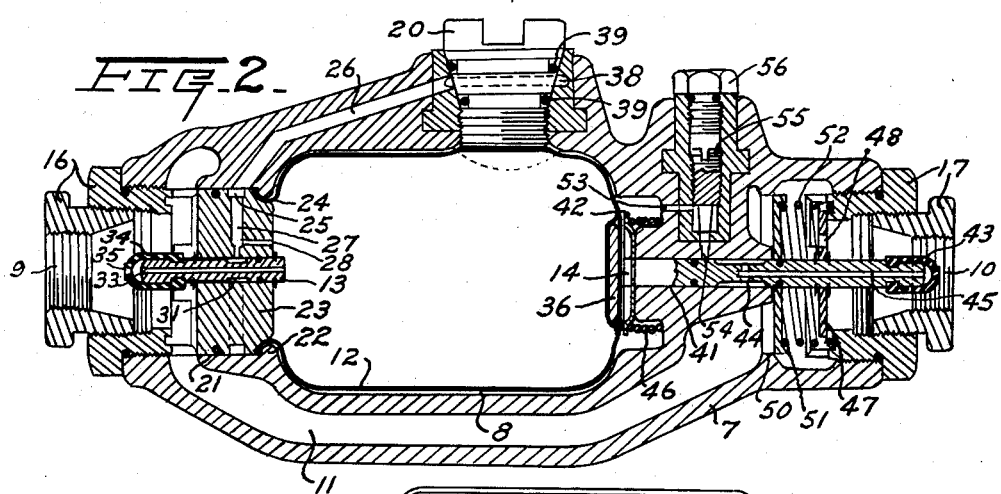
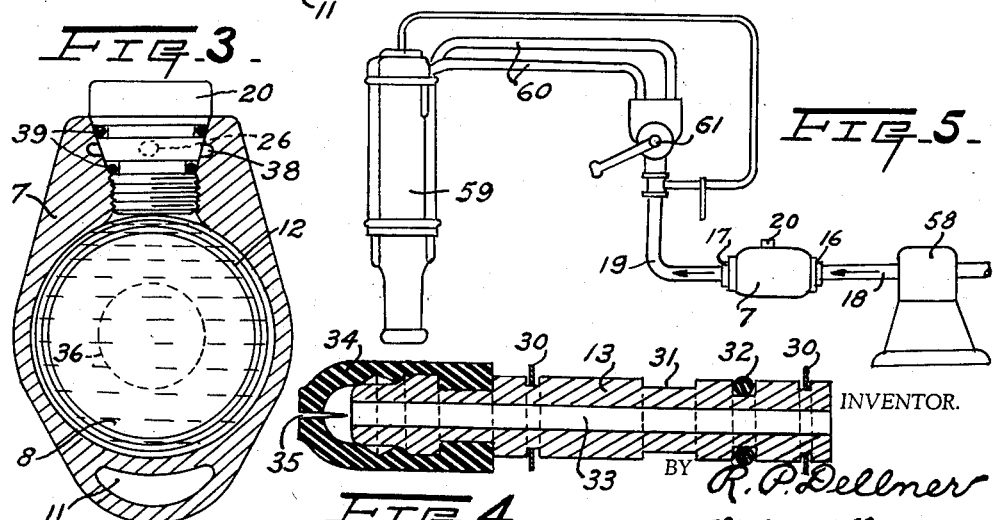
INVENTOR.
BY R. P. Dellner
Lieber & Lieber
ATTORNEYS.

United States Patent Office 2,897,919
Patented Aug. 4, 1959

2,897,919
AIRLINE OILER

Raymond P. Dellner, North Olmsted, Ohio, assignor to Westinghouse Air Brake Company, Wilmerding, Pa., a corporation of Pennsylvania Application March 21, 1957, Serial No. 647,549

13 Claims. (Cl. 184—55)

The present invention relates in general to improvements in the art of lubrication, and it relates more specifically to improvements in the construction and operation of so-called airline oilers for injecting lubricant into the conduits for conducting air under pressure from a source of supply to equipment operable by the compressed air.

The primary object of this invention is to provide an improved airline oiler which is simple and compact in structure, and which is also highly effective and reliable in operation.

Many different types of so-called airline oilers for introducing lubricant into the streams of compressed air being fed to pneumatically actuated portable tools or the like, have heretofore been proposed and used commercially, but all of these prior devices have been objectionable for various reasons. Such an oiler in order to be practical, must function automatically to inject precisely the proper quantity of oil into the air stream uniformly and in such condition as to avoid slugs of the liquid, and it must therefore be readily adjustable to vary the rate of oil injection so as to meet varying demands for the lubricant. In order to eliminate waste of oil and overfeeding, the delivery of the lubricant must also be positively interrupted when the demand for compressed air ceases; and in order to also avoid damage to the equipment being actuated by compressed air due to lack of lubrication, the oiler should also function to stop the flow of air whenever the supply of oil is exhausted. Then too, such an airline oiler should be adapted to be refilled either while the flow of compressed air is continuing or when such flow ceases, and such replenishment of the lubricant supply must be conveniently and safely accomplished. None of the prior airline oilers have been capable of meeting all of these operating conditions, and many have been too complicated and difficult to install and to maintain in operating condition.

It is therefore an important object of the present invention to provide an improved airline oiler unit which effectively meets all of the above mentioned operating conditions.

Another important object of this invention is to provide an automatically functioning airline oiler adapted to be readily inserted directly in a compressed air conducting conduit with the oil confining chamber in axial alinement with the conduit and without obstructing the normal flow of the air through the latter.

A further important object of the invention is to provide an improved oiling device for compressed air actuated equipment, which automatically stops the operation of the equipment whenever the oil supply is exhausted, but wherein this supply can be quickly and safely replenished at any time.

Still another important object of the present invention is to provide an improved lubricant supply unit for pneumatic tools or the like, in which the lubricant is injected into the air conducting line feeding the tool in the form of a uniform mist spray, and wherein the rate of injection may be varied at any time with utmost precision.

An additional important object of this invention is to provide a highly reliable airline oiling unit which is flexible in adaptation to meet varying operating conditions, and which requires minimum attention after being properly installed and adjusted.

These and other more specific objects and advantages of the invention will be apparent from the following detailed description.

A clear conception of the features constituting the present improvement, and of the construction and operation of a typical airline oiler embodying the invention, may be had by referring to the drawing accompanying and forming a part of this specification wherein like reference characters designate the same or similar parts in the various views.

Fig. 1 is a central longitudinal vertical section through a commercial airline oiler unit, showing the parts in condition for normal use, and with the oil confining chamber filled with lubricant;

Fig. 2 is a similar section through the same unit, but showing the condition of the parts when the oil supply has been exhausted;

Fig. 3 is a transverse vertical section through the same oiling unit, taken along the line 3—3 of Fig. 1;

Fig. 4 is an enlarged central longitudinal section through the air metering pin and reed valve assembly at the inlet end of the same unit; and Fig. 5 is a diagram of a typical pneumatic tool actuating system embodying one of the improved oilers.

While the invention has been illustrated and described herein as having been embodied in an airline oiler which is especially adapted for insertion in the compressed air supply conduit leading to a pneumatically actuated portable tool, it is not the intent to necessarily restrict the improvements to such usage; and it is also contemplated that specific descriptive terms employed herein be given the broadest possible interpretation consistent with the disclosure.

Referring to the drawing, the improved airline oiling unit illustrated comprises in general, a main casing 7 having therein a relatively large oil confining chamber 8 and being provided with a compressed air inlet 9 at one side and with an axially alined air outlet 10 at the opposite side of the chamber 8 interconnected by a lower passage 11 which is segregated from this chamber; a flexible bellows or diaphragm 12 spanning the chamber 8 and coacting along one face with the oil confined in the latter while its opposite face is sealed from this oil; a normally fixed metering pin 13 at the inlet end of the casing 7 constructed and mounted to admit air under pressure from the inlet 9 to the oil sealed face of the diaphragm 12 in order to subject the confined oil to pressure by distorting the bellows; and an axially movable pin 14 at the outlet end of the casing 7 constructed and mounted to normally permit escape of the pressure subjected oil from the chamber 8 into the air stream flowing from the inlet 9 through the outlet 10 via the passage 11.

The main casing 7 may be formed of a unitary casting provided at its opposite ends with axially alined sealing bushings 16, 17 surrounding the inlet 9 and outlet 10 and adapted to be attached to compressed air supply and discharge conduits 18, 19 respectively of a system such as shown in Fig. 5, and the top of the casing 7 has a specially formed oil supply opening therein which is communicable with the oil confining chamber 8 but is normally sealed by a removable plug 20. The air inlet end of the casing 7 is provided with a bore 21 having an annular inwardly extending ridge 22 at one end thereof, and an annular partition 23 is snugly sealingly confined within this bore 21 by one of the end closure bushings 16 so as to sealingly clamp the adjacent annular end 24 of the bellows 12 between the ridge 22 and the partition 23. The partition 23 has an annular peripheral groove 25 which communicates with the fresh oil supply opening of the casing 7 through a casing duct 26, and which also connects with a radial passage 27 in the partition 23 having a constricted inner end and the medial portion of which communicates with the chamber 8 through an orifice 28, see Figs. 1 and 2.

The center of the partition 23 is bored to loosely receive the metering pin 13 and the latter is fixed against pronounced axial displacement by axially spaced snap rings 30 adapted to engage the opposite ends of the partition 23 but which still provide a restricted conduit surrounding the pin 13 and connecting the inlet 9 with an annular recess 31 formed in this pin and registering with the restricted inner end of partition passage 27, see Figs. 1, 2 and 4. The pin 13 is embraced by a sealing ring 32 and has a central opening 33 extending longitudinally therethrough, and the outer end of the pin 13 is sealingly embraced by the brim of a cup-shaped pliable rubber jet cap or reed valve 34 having a transverse slit 35 therein across the bottom of the cup, as depicted in Fig. 4. This slit 35 is normally sealed by external air pressure surrounding the pliable cup to prevent air from flowing from the inlet 9 to the chamber 8, whenever the air pressure in the inlet 9 is greater than the pressure in the chamber 8; and the valve 34 also permits rapid equalization of pressure through the slit 35 between the inlet 9 and chamber 8 whenever the pressure is higher in the chamber than at the inlet. While the end of this bellows or flexible diaphragm 12 nearest to the inlet 9 is clamped and sealed by the partition 23, the opposite end thereof may be provided with a reinforcing plate 36, and this bellows 12 is preferably formed of durable synthetic rubber compound having great flexibility and elasticity.

The special oil supply opening at the top of the casing 7 has a tapered upper section end merging into a threaded lower section as shown in Figs. 1, 2 and 3, and the upper section is surrounded by an annular recess 38 which communicates with the casing duct 26. The closure plug 20 has a screw threaded lower end adapted to coact with the lower threads of the casing oil filling opening, and is also provided with a tapered portion adapted to snugly fit the tapered upper section of this opening. The plug 20 is also grooved for the reception of sealing rings 39 adapted to coact with the tapered section of the filling opening on opposite sides of the recess 38, so that when the plug 20 is driven home there is no possibility of having air or oil escape from within the casing 7 past this plug. However, when the plug 20 is removed for the purpose of replenishing the oil in the chamber 8, and with the inlet 9 exposed to air pressure, a slight amount of compressed air will escape past the periphery of the pin 13 and through the recess 31, passage 27, groove 25, and duct 26 to the ambient atmosphere, but this flow of air is hardly perceptible.

The end of the main casing 7 nearest to the outlet 10, is provided with a central bore 41 within which the pin 14 is snugly but slidably confined, see Figs. 1 and 2. The pin 14 has a pusher plate 42 secured to one end and a reed valve 43 attached to its opposite end, while its medial portion is provided with an annular peripheral recess 44 which communicates with the interior of the reed valve 43 through a central opening 45 in the pin 14. The pusher plate 42 is adapted to be engaged by the end of the bellows 12 when expanded as in Fig. 2, and this plate 42 coacts with one end of a helical spring 46 the opposite end of which reacts against the casing 7. The reed valve 43 is formed of soft pliable rubber and is of the same construction as the valve 34 carried by the metering pin 13, and the portion of the pin 14 between the recess 44 and the valve 43 has a disk valve 47 secured thereto by means of snap rings 30. This valve 47 is provided with a small local opening 48, and is adapted to engage an annular seat formed on one of the end bushings 17 when the oil supply in the chamber 8 has been exhausted, so as to shut off the delivery of compressed air through the outlet 10.

The outlet end of the casing 7 is also provided with a large bore 50 disposed coaxially of the bore 41 and with which a compressed air flow control disk valve 51 is cooperable, and this valve 51 coacts with one end of another helical spring 52, while the opposite end reacts against the same bushing 17 on which the seat for the disk valve 47 is formed. This disk valve assemblage is such that when the unit is functioning normally as in Fig. 1, the spring 46 will move the pin 14 away from the outlet 10 so as to bring the valve 47 into engagement with the valve 51; but when this pin 14 is moved toward the outlet 10 as in Fig. 2, the valve 47 will move freely within the spring 52 and will engage the bushing 17. The medial recess 44 of the axially movable pin 14 is adapted to communicate with the oil supply chamber 8 during normal operation of the unit through a port 53 and a passage 54 past a regulating valve 55 adjustably confined within the casing 7 and which is normally concealed by a closure plug 56, but when the pin 14 moves toward the outlet 10 so as to close the valve 47 the communication between the recess 44 and the passage 54 is cut off. The regulating valve 55 is screw threaded in the casing 7 and may be adjusted with the aid of a screw driver at any time after the plug 56 has been removed.

When the various parts of the improved airline oiler have been properly constructed and assembled as above described, the unit may be installed in a typical compressed air system such as depicted in Fig. 5, comprising a source of compressed air such as a compressor 58, compressed air actuated equipment such as a portable and universally movable impact tool 59, conduits 18, 19, 60 leading from the compressor 58 to the tool 59, and a manually operable control valve 61 located in the airline. The airline conduits 60 may be flexible hoses while the conduit sections 18, 19 may be relatively rigid pipes, and the oiling unit should have its inlet 9 connected to the pipe section 18 communicating with the compressor 58 while its outlet 10 should be connected to the pipe section 19 communicating with the tool 59. With the oiling device thus installed the oil chamber 8 should be filled with oil as in Figs. 1 and 3 while the plug 20 is removed, and after this plug is firmly reapplied the normal operation of the oiler is as follows.

Whenever there is a subsequent demand for compressed air at the tool 59 and the valve 61 is open, air will flow as required through the inlet 9 and passage 11, past the spring loaded flow control valve 51, and through the outlet to the tool, as shown in Fig. 1. While the air is thus flowing through the casing 7, a limited quantity of compressed air passes through the annular gap surrounding the meter pin 13 and through the recess 31, passage 27 and port 28 into the chamber 8 within the flexible bellows diaphragm 12. Due to the spring loading of the valve 51, the air within the outlet 10 will be at a few pounds lower pressure than that within the inlet 9, so that the compressed air thus admitted to the chamber 8 will also build up to a higher pressure than that escaping from the outlet 10 and will thus gradually expand the bellows 12. As the bellows expands it naturally exerts a pressure on the oil confined in the chamber 8 and gradually forces this oil through the orifice 53, past the regulating valve 55, through the passage 54, recess 44, and central opening 45 in the pin 14, so that this oil is constantly delivered in the form of a uniform spray through the slit 35 of the reed valve 43 and mingles with the compressed air passing to the tool 59 through the outlet 10.

While the unit is thus functioning, compressed air will also enter the casing duct 26 and recess 38, but the sealing rings 39 associated with the refill plug 20 will prevent escape of this air. However, when the supply of oil is exhausted, the bellows diaphragm 12 will be expanded by the internal air pressure to such an extent that its end which is reinforced by the plate 36 will contact the pusher plate 42 and will thereby move the pin 14 longitudinally toward the casing outlet 10, simultaneously compressing the spring 46 and closing the disk valve 47 as in Fig. 2. If the filling cap or plug 20 is subsequently removed, the compressed air within the bellows 12 will be quickly exhausted to the ambient atmosphere through the port 28, passage 27 and recess 38 thereby causing this bellows to collapse and to assume the position shown in Fig. 1, and in order to enable the pin 14 to move back toward the chamber 8 under the influence of the spring 46 coacting with the push plate 42, the pneumatic tool 59 must be momentarily shut off so as to enable air under pressure to pass through the small hole 48 in the disk valve 47 and to equalize the pressures on the opposite sides of this valve. The collapse of the bellows diaphragm 12 is also augmented by suction due to the Venturi formation of the passage 27 in the partition 23, which causes the air from within the bellows to be quickly withdrawn through the port 28 and to mingle with the slight amount of compressed air flowing from the inlet 9 along the metering pin and through the constricted inner end of the passage 27.

If the air supply to the inlet 9 is cut off, the residual compressed air within the bellows must be quickly released in order to prevent oil from being delivered from the camber 8, and under these conditions the reed valve 34 functions to permit the confined air to promptly escape into the inlet 9 thus stopping the delivery of oil from the chamber 8. It will thus be noted that while the reed valve 43 serves to spray oil uniformly into the compressed air passing to the tool 59 during normal operation, this valve 43 also serves as a check valve while the oil supply plug 20 is removed. The other reed valve 34 is normally sealed to prevent air from flowing from the inlet 9 to the chamber 8 whenever the air pressure in the inlet is greater than in the chamber 8, as when the plug 20 is removed while air under pressure is in the rest of the system and air from inside of the bellows 12 is being vented to atmosphere through the ports 28, 27, 25, 26. The valve 34 also functions to allow rapid equalization of pressures between the inlet 9 and the chamber 8 whenever the pressure in this chamber is higher than at the inlet, by permitting excess air to bleed back into the inlet and thus equalize these pressures so as to prevent oil from splurging into the air stream due to having compressed air trapped within the bellows as when the compressed air supply to the oiler fails while the plug 20 is closed.

The flow control valve 51 opens under a normal flow of air passing through the oiler and produces the differential of pressure between the inlet 9 and the outlet 10 required to feed the oil into the air stream. The annular groove 25 in the partition 23 merely insures proper communication between the groove 31 of the metering pin 13 and the duct 26 even if the partition 23 is not accurately aligned, and the various sealing rings shown effectively prevent undesirable escape of oil and compressed air from the unit, and from one internal zone to another.

From the foregoing description it should be apparent that the present invention in fact provides an improved airline oiler which is simple, compact and durable in construction, and which is highly effective and automatic in operation. The various parts of the structure are formed so that they may be readily assembled and just as easily dismantled for inspection and cleaning, and by manipulating the regulating valve 55 the rate of delivery of the oil can be varied even when the unit is in operation. When the oil chamber 8 is emptied, the flow of compressed air to the zone of utilization ceases, and the oil replenishing plug 20 may be removed to refill this chamber, with or without shutting off the compressed air supply to the oiler; but if the plug 20 is removed while a supply of oil remains in this chamber, the plug 20 may be removed and compressed air will continue to flow to the zone of utilization but no oil will be fed into the air stream at that time.

The supply of oil may be replenished at any time but the withdrawal of compressed air should be interrupted momentarily in order to allow the pin 14 to return toward the inlet end of the unit after it has assumed the position shown in Fig. 2. The use of the reed valves 34, 43 at the opposite ends of the unit also insures quick collapse of the bellows diaphragm 12 when the air supply is shut off, and also produces effective spraying of the oil into the compressed air stream; while the bellows formation of the diaphragm enables the use of a relatively large oil confining space within a casing 7 of small size.

The formation of the refill plug 20 and the provision of the annular recess 38 in the casing 7 and which communicates with the duct 26, is of considerable importance in preventing this duct 26 from being accidentally shut off as by placing a finger over the outlet end thereof. If this happens while the plug 20 is removed, the bellows 12 will expand and its wall may burst through the filling opening, so that the recess 38 in fact constitutes an important safety feature. The improved units can be produced at moderate cost in various sizes for diverse uses, and have proven highly satisfactory and successful in actual use.

It should be understood that it is not desired to limit this invention to the exact details of construction and operation of the airline oiler herein specifically shown and described, for various modifications within the scope of the appended claims may occur to persons skilled in the art.

I claim:

1. An airline oiler comprising, a casing having therein an oil confining chamber and being provided with an air inlet at one side and with an air outlet at the opposite side of said chamber interconnected by an air passage segregated from the chamber, a flexible diaphragm spanning said chamber and coacting along one face with the oil in said chamber but having its opposite face sealed from said oil, means for admitting air under pressure from said inlet to said sealed diaphragm face to subject the confined oil to pressure by distorting the diaphragm, conduit means movable by said diaphragm and being communicable with said chamber to normally deliver the pressure subjected oil into the air stream delivered from said inlet through said outlet via said passage, and a shut-off valve for the air flow operable by the movement of said conduit means.

2. An airline oiler comprising, a casing having therein an oil confining chamber and being provided with an air inlet at one side and with an air outlet at the opposite side of said chamber interconnected by an air passage segregated from the chamber, a flexible diaphragm spanning said chamber and coacting along one face with the oil in said chamber but having its opposite face sealed from said oil, means for admitting compressed air to one face of said diaphragm to subject the confined oil to pressure, conduit means movable by said diaphragm and being normally operable to deliver regulated quantities of the pressure subjected oil in spray formation into the air stream delivered from said inlet to said outlet via said passage, and a shut-off valve for the air flow operable by the movement of said conduit means.

3. An airline oiler comprising, a casing having therein an oil confining chamber and being provided with an air inlet at one side and with an air outlet at the opposite side of said chamber interconnected by an air passage segregated from the chamber, a flexible diaphragm spanning said chamber and coacting along one face with the oil in said chamber but having its opposite face sealed from said oil, a metering device for admitting air under pressure from said inlet to said opposite diaphragm face to subject the confined oil to pressure by distorting the diaphragm, an axially movable reed valve having a carrying member and being communicable with said chamber normally spraying the pressure subjected oil into the air stream delivered from said inlet through said passage and said outlet, and other valve means operable by the movement of said reed valve carrying member to interrupt the air flow through said passage whenever the oil supply is exhausted.

4. An airline oiler comprising, a casing having therein an oil confining chamber and being provided with an air inlet at one side and with an air outlet at the opposite side of said chamber interconnected by an air passage segregated from the chamber, a bellows spanning said chamber and coacting externally with the oil in said chamber but being internally sealed from said oil, means forming a restricted passage for admitting air under pressure from said inlet to the bellows interior to subject the external oil to pressure by expanding the bellows, means forming a longitudinally movable conduit normally communicable with said chamber for delivering the pressure subjected oil into the air stream delivered from said inlet through said passage and said outlet, and a shut-off valve carried by said conduit forming means and being operable thereby to interrupt the air flow whenever the oil supply fails.

5. An airline oiler comprising, a casing having therein an oil confining chamber and being provided with an air inlet at one side and with an air outlet at the opposite side of said chamber interconnected by an air passage segregated from the chamber, a bellows spanning said chamber and coacting externally with the oil in said chamber but being internally sealed from said oil, means forming a restricted passage for admitting air under pressure from said inlet to the bellows interior to subject the external oil to pressure by expanding the bellows, a reed valve communicable with said chamber near the outlet end of said casing passage for spraying the pressure subjected oil from the bellows exterior into the air stream flowing from said inlet to said outlet via said passage, and another reed valve communicable with said chamber near the inlet end of said casing passage for relieving the from within said bellows to effect collapse thereof.

6. An airline oiler comprising, a casing having therein an oil confining chamber and being provided with an air inlet at one side and with an air outlet at the opposite side of said chamber interconnected by an air passage segregated from the chamber, a bellows spanning said chamber and coacting externally with the oil in said chamber but being internally sealed from said oil, means forming a restricted passage for admitting air under pressure from said inlet to the bellows interior to subject the external oil to pressure by expanding the bellows, a reed valve communicable with said chamber for spraying the pressure subjected oil from the bellows exterior into the air stream flowing through said casing, and another reed valve communicable with said chamber for relieving the pressure from within said bellows when the oil supply is exhausted.

7. An airline oiler comprising, a casing forming an oil confining chamber having an upper filling opening and being provided with an air inlet at one side and with an air outlet at the opposite side of said chamber interconnected by an air passage segregated from the chamber, a removable closure for said opening, a flexible bellows spanning said chamber and coacting externally with the oil in said chamber but being internally sealed from said oil, conduit means for admitting air under pressure from said inlet to the bellows interior to subject the external oil to pressure by expanding the bellows, other conduit means communicable with said chamber externally of said bellows for delivering the pressure subjected oil into the air stream flowing from said inlet through said passage and said outlet, and still other conduit means for effecting escape of air through said filling opening to suck air from within the bellows when said closure is removed.

8. An airline oiler comprising, a casing forming an oil confining chamber having an upper filling opening and being provided with an air inlet at one side and with an air outlet at the opposite side of said chamber interconnected by an air passage segregated from the chamber, a removable closure for said opening, a flexible bellows spanning said chamber and coacting externally with the oil in said chamber but being internally sealed from said oil, initial conduit means for normally admitting compressed air to said bellows to force oil from said chamber into the air stream flowing through said casing, and other conduit means for effecting withdrawal of air from said bellows through said filling opening whenever said closure is removed.

9. An airline oiler comprising, a casing having therein a chamber and being provided with passage interconnected compressed air inlet and outlet openings on opposite sides of the chamber, a flexible diaphragm spanning said chamber and dividing the same into segregated oil-free and oil-confining spaces, conduit means for admitting air under pressure from said inlet to said oil-free chamber space to flex said diaphragm and to thereby subject the oil confined in the other space to pressure, initial valve means between said air inlet and outlet for creating a zone of somewhat lower air pressure in the latter, other conduit means connecting said oil confining space with said lower pressure outlet zone for injecting oil into the compressed air delivered from said outlet, and other valve means operable to interrupt the air flow whenever the oil supply fails.

10. An airline oiler comprising, a casing having therein a chamber and being provided with passage interconnected compressed air inlet and outlet openings on opposite sides of the chamber, a flexible diaphragm spanning said chamber and dividing the same into segregated oil-free and oil-confining spaces, conduit means for admitting air under pressure from said inlet to said oil-free chamber space to flex said diaphragm and to thereby subject the oil confined in the other space to pressure, other conduit means movable by said diaphragm and being communicable with said oil-confining space to deliver oil therefrom into the air stream delivered from said outlet, and valve means operable by said other conduit means to retard the flow of air through said outlet when the oil confining space is empty.

11. An airline oiler comprising, a casing having therein a chamber and being provided with passage interconnected compressed air inlet and outlet openings on opposite sides of the chamber, a flexible diaphragm spanning said chamber and dividing the same into segregated oil-free and oil-confining spaces, conduit means for admitting air under pressure from said inlet to said oil-free chamber space to flex said diaphragm and thereby subject the oil confined in the other space to pressure, valve means between said air inlet and outlet for creating a zone of somewhat lower air pressure in the latter, other conduit means movable by said diaphragm and connecting said oil confining space with said lower pressure outlet zone for injecting oil into the compressed air delivered from said outlet, and other valve means movable by said other conduit means for shutting off the flow of air through said outlet when the oil supply in said oil confining space is exhausted.

12. An airline oiler comprising, a casing having therein a chamber and being provided with passage interconnected compressed air inlet and outlet openings on opposite sides of the chamber, a flexible diaphragm spanning said chamber and dividing the same into segregated oil-free and oil-confining spaces, conduit means for admitting air under pressure from said inlet to said oil-free chamber space to flex said diaphragm and to thereby subject the oil confined in the other space to pressure, said casing also having therein an oil supply opening and a closure plug surrounded by an annular recess in the casing and communicating through a restricted duct with said conduit means, and other conduit means communicable with said oil confining space for delivering oil therefrom into the air delivered from said outlet.

13. An airline oiler comprising, a casing having therein a chamber and being provided with passage interconnected compressed air inlet and outlet openings on opposite sides of the chamber, a flexible diaphragm spanning said chamber and dividing the same into segregated oil-free and oil-confining spaces, conduit means for admitting air under pressure from said inlet to said oil-free chamber space to flex said diaphragm and to thereby subject the oil confined in the other space to pressure, said casing also being provided with an oil supply opening communicating with said oil confining space and which is surrounded by an annular recess formed in the casing and communicating through a restricted duct with said conduit means, a removable closure plug for normally sealing said opening and said recess and duct, and other conduit means communicable with said oil confining space and having a discharge valve for spraying oil from said space into the air stream flowing from said outlet.

References Cited in the file of this patent

UNITED STATES PATENTS

| | | |
|---|---|---|
| 1,984,422 | Nell | Dec. 18, 1934 |
| 2,702,094 | Maha | Feb. 15, 1955 |
| 2,778,619 | Goodyer | Jan. 22, 1957 |
| 2,797,772 | Beckmann | July 2, 1957 |